(12) United States Patent
Sood et al.

(10) Patent No.: US 8,436,305 B1
(45) Date of Patent: May 7, 2013

(54) INFRARED RADIATION SENSING DEVICE USING A CARBON NANOTUBE AND POLYMER COMPOSITION AND METHOD OF MAKING THE SAME

(75) Inventors: Ashok K. Sood, Brookline, MA (US); Elwood J. Egerton, Hot Springs, SD (US)

(73) Assignee: Magnolia Optical Technologies, Inc., Woburn, MA (US)

( * ) Notice: Subject to any disclaimer, the term of this patent is extended or adjusted under 35 U.S.C. 154(b) by 0 days.

(21) Appl. No.: 13/423,118

(22) Filed: Mar. 16, 2012

Related U.S. Application Data

(60) Provisional application No. 61/453,531, filed on Mar. 16, 2011.

(51) Int. Cl.
*G01J 5/10* (2006.01)
(52) U.S. Cl.
USPC .................................................. 250/338.1
(58) Field of Classification Search ............... 250/338.1; 252/502; 257/40
See application file for complete search history.

(56) References Cited

U.S. PATENT DOCUMENTS

| 7,723,684 B1 * | 5/2010 | Haddon et al. ............. 250/338.1 |
| 2005/0000830 A1 * | 1/2005 | Glatkowski et al. .......... 205/775 |

* cited by examiner

*Primary Examiner* — Mark R Gaworecki
(74) *Attorney, Agent, or Firm* — Loginov & Associates, PLLC; Keri E. Sicard; William A. Loginov

(57) ABSTRACT

Infrared radiation detecting and sensing systems and devices using carbon nanotubes and polymers and methods to making the same. In illustrative embodiments of the invention, it includes a substrate, a suspended carbon nanotube fabric and polymer, first and second conducting interconnects each in electrical communication with the nanotube polymer fabric. Nanotube/polymer fabrics can be modified to increase the temperature coefficient of resistance to increase sensitivity to IR radiation.

20 Claims, 3 Drawing Sheets

INFRARED RADIATION SENSING DEVICE USING A CARBON NANOTUBE AND POLYMER COMPOSITION AND METHOD OF MAKING THE SAME

RELATED APPLICATIONS

This application claims the benefit of U.S. Provisional Application Ser. No. 61/453,531, filed Mar. 16, 2011, entitled INFRARED RADIATION SENSING DEVICE USING A CARBON NANOTUBE AND POLYMER COMPOSITION AND METHOD OF MAKING THE SAME, the entire disclosure of which is herein incorporated by reference.

STATEMENT REGARDING FEDERALLY SPONSORED RESEARCH OR DEVELOPMENT

This invention was made with U.S. government support under Contract Number W31P4Q09C0050 awarded by the U.S. Army on behalf of the Defense Advanced Research Projects Agency (DARPA). The government has certain rights in this invention.

FIELD OF THE INVENTION

This invention relates generally to nanotube fabrics and, more specifically, to carbon nanotube fabrics and polymers for use in devices and systems.

BACKGROUND OF THE INVENTION

Photodetectors are an integral part of optical circuits and components (such as emitters, modulators, repeaters, waveguides or fibers, reflectors, resonators, detectors, etc.) and are used for the sensing of electromagnetic radiation. Photoconducting materials, typically semiconductors, have electrical properties that vary when exposed to electromagnetic radiation (i.e. light). One type of photoconductivity arises from the generation of mobile carriers (electrons or holes) during absorption of photons. For semiconducting materials, the absorption of a specific wavelength of light, hence photon energy, is directly proportional to the band gap of the material ($E_g=hc/\lambda$, where $E_g$ is the materials band gap, h is Plank's constant ($4.136 \times 10^{-15}$ eVs), c is the speed of light in a vacuum ($2.998 \times 10^{10}$ cm/s) and k is the wavelength of the radiation). If the band gap energy is measured in eV (electron Volts) and the wavelength in micrometers, the above equation reduces to $E_g=1.24/\lambda k$. A photodiode (i.e. p-n diode, p-i-n photodiode, avalanche photodiode, etc.) is the most commonly employed type of photoconductor. Light detection is ideally suited for direct band gap semiconductors such as Ge, GaAs, etc.; however, indirect band gap semiconductors (where an additional phonon energy is required to excite an electron from the valence band to the conduction band), such as Silicon, are also used as photodetectors. Probably the most widely known type of photodetctor is the solar cell, which uses a simple p-n diode or Schottky barrier to detect impinging photons. Besides silicon, most photodetectors do not integrate with current microelectronics technology, usually detect only a specific wavelength (i.e. 1.1 µm for Si, 0.87 µm for GaAs, 0.414 µm for α-SiC and 1.89 µm for Ge), and require multiple detectors to detect a broad band of wavelengths (hence photon energy).

Besides photodiodes, there are other types of photodetectors that do not rely on the generation of current through the excitation of electrons (or holes). One type of such a detector is the bolometer. Bolometers operate by absorbing radiation, which in turn raises the temperature of the material and hence alters the resistance of the material. Bolometers can be constructed from either metallic, metallic-oxides or semiconducting materials. Since bolometers detect a broad range of radiation above a few microns, bolometers are typically thermally stabilized to reduce the possibility of detection of blackbody radiation that is emitted from the detector material, which leads to a high background noise. Another type of non-photo-generated detector is the pyroelectric detector. Pyroelectric detectors operate by sensing induced surface charges that are related to changes in the internal dipole moment generated from temperature shifts in the material.

It is possible for far-IR (Infrared) to visible light detection from individual single-walled nanotubes (SWNTs). Carbon nanotubes possess discrete absorption peaks that correspond to specific photon energies. These absorption peaks directly correlate to the diameter of the carbon nanotube.

Existing micro bolometers utilize vanadium oxide as the element which changes impedance for incoming IR radiation. Typically 2% per degree C. is the highest thermal coefficient of resistance achievable. This performance is limited by 1/f noise and the basic properties of the vanadium oxide film. The VOx based micro bolometer is fabricated on top of the CMOS readout circuit, which provides a cost benefit. There is a need for a detection circuit that provides electrical outputs for sufficient light detection from the nanotube material in the proximity of the predefined region.

SUMMARY OF THE INVENTION

The invention provides IR detectors using a nanotube material and methods of making same. According to one aspect of the invention, a light detector includes a nanotube material or fabric that is in electrical communication with a first and a second contact; and a detection circuit in electrical communication with the first and second contacts. The detection circuit provides electrical outputs for sufficient light detection from the nanotube article in the proximity of the predefined region.

According to an illustrative embodiment of the invention the predefined region is a channel formed in the substrate and between two electrical contacts. According to another illustrative embodiment of the invention the predefined region is between two electrical contacts. The light detection can be integrated with semiconductor circuits including CMOS circuits.

According to an illustrative embodiment the invention a polymer carbon nanotube fabric detects light by electron-hole pair recombination.

According to another illustrative embodiment of the invention a carbon nanotube fragment and a polymer patent detects light by the creation of phonons, which in turn produce an electrical signal.

The IR sensing device can be fabricated by depositing catalysts on a substrate, growing carbon nanotubes in a vertical orientation, and undergoing a tumble process to horizontally align the carbon nanotubes. In an illustrative embodiment, metal contacts can then be applied to the substrate to provide appropriate contacts for detecting IR radiation.

BRIEF DESCRIPTION OF THE DRAWINGS

The invention description below refers to the accompanying drawings, of which.

DETAILED DESCRIPTION

According to an illustrative embodiment, fabrics including a carbon nanotube and polymer composition are suspended over gaps and function as electromagnetic radiation detectors due to the characteristics of the carbon nanotube and polymer composition. With moderate photon count, light detection is possible by fabric heating, such as occurs when using a bolometer. An exemplary technique for detecting electromagnetic radiation is the generation of a photocurrent by electron-hole recombination, through the generation of heat which produces a resistance change in the fabric. Thus, providing fabrics with a coefficient changing polymer improves detection of Infrared (IR) radiation.

Illustrative embodiments of the invention allow integration at a level of one light detector per transistor at the minimum dimension of a given lithography node or the integration of large arrays that are addressed by CMOS logic circuits. Previously, according to the prior art, only discrete components, such as silicon p-n diodes, could be used as light detectors for optoelectronic circuits. Other types of detectors require complex and difficult fabrication techniques such as flip-chip processes to integrate with silicon semiconductor technology. Because CNT light sensors can be integrated to form VLSI arrays, thus enabling optical interconnects with one light detector per transistor (or waveguide, depending on function), the fabrication of ultra-dense optical circuits is possible.

Typical band-gaps for carbon nanotubes (CNTs) range from approximately 0.6-1.2 eV, depending on the diameter of the CNT, where the band gap is proportional to the inverse diameter of the nanotube. These energies correlate to the ability of the nanotubes to detect radiation in the near IR range. Since nanotubes can also generate heat and phonons by several processes (injection of electrons, impinging with radiation, etc.), a CNT fabric is also ideally suited as an IR detector.

Figure 1:
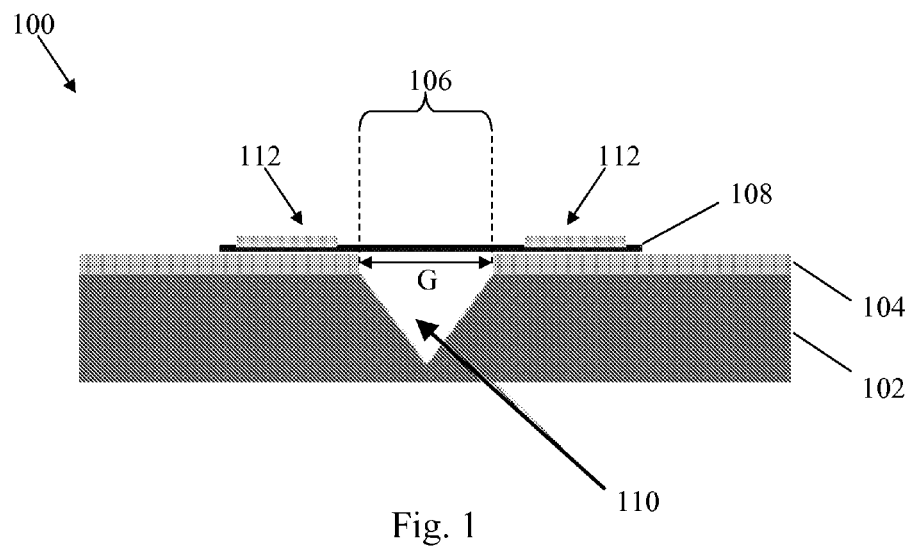
FIG. 1 is a side view of an Infrared (IR) detecting device having a detecting element that includes a suspended carbon nanotube and polymer fabric, according to an illustrative embodiment of the present invention.

An illustrative embodiment shown in FIG. 1 depicts an IR detecting device 100 that includes a substrate 102 having a thin film material 104 deposited thereon. The substrate material 102 can be the same insulating material as the second material 104 or the substrate material 102 can be a semiconductor [such as, but not limited to, Si (single crystal, poly-crystalline and amorphous), Ge, SiGe, SiC, Diamond, GaN, GaAs, GaP, AlGaAs, InP, GaP, CdTe, AlN, InAs, $Al_xIn_{1-x}P$, and other III-V and II-VI semiconductors) or a conductor (such as, but not limited to, Al, Cu, W, Al(<1% Cu), Co, Ti, Ta, W, Ni, Mo, Pd, Pt, TiW, Ru, $CoSi_x$, $WSi_2$, $TiSi_x$, TaN, TiN, TiAlN, RuN, RuO, PtSi, $Pd_2Si$, $MoSi_2$, $NiSi_x$)].

The IR detecting device 100 has a suspended region 106 proximate a light detecting element 108 that overlies the substrate structure. The substrate 102 and thin film 104 have a channel or trench 110 etched therein that defines a gap 'G' on the upper surface of the substrate material. The light detecting element 108 is illustratively a fabric material, such as a carbon nanotube and polymer composition material as described in greater detail herein. The gap G is formed by making a trench 110 with a KOH (potassium hydroxide) wet etch or any other device known to those of ordinary skill in the art. The shape and structure of the trench or channel 110 is highly variable and can be formed according to known techniques to generate an appropriate gap G. The gap G defines the suspended region 106 of the detecting element 108. The gap G thermally isolates the light detecting element 108 from the surrounding structure. The suspended region 106 of nanofabric 108 defines the electromagnetic sensing region of the detecting element 108. The light detection from the detecting element 108 is controlled by driving circuitry 130. This region 106 is disposed between the metal contacts 112 that are deposited on the IR detecting device 100, which is proximate the gap G of the substrate structure.

Light impinged on the open area (106) of these SWNT/Multiwall carbon nanotube fabrics can cause the generation of a photocurrent (such as a photodiode), and the generation of heat in the fabric, in the manner as a bolometer measures the energy of incident electromagnetic radiation.

Suspended fabrics are suitable structures for monolayered fabrics, which have a high porosity. Since the substrate can influence the detection of radiation, the suspended region diminishes any disadvantageous substrate effects.

According to various embodiments of the invention, the detecting elements can be made from a nanotube fabric, layer, or film. Carbon nanotubes with tube diameters as small as 1 nm serve as electrical conductors that are capable of carrying extremely high current densities. They also have the highest known thermal conductivity, and are thermally and chemically stable.

Figure 2:
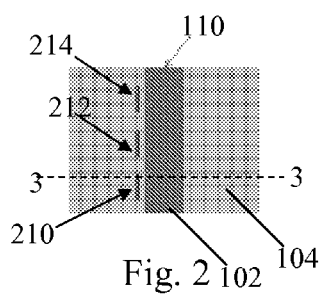
FIG. 2 is a top view of the substrate of the IR detecting device having a catalyst deposited thereon, according to the illustrative embodiments.

Reference is made to FIGS. 2-5 showing the fabrication sequence for producing an IR detecting device according to the illustrative embodiments. FIG. 2 is a top view of the IR sensing device in its preliminary stage comprising the substrate 102 and thin film material 104 deposited thereon with a trench 110 etched in both. As shown in FIG. 2, the catalysts 210, 212 and 214 are deposited on the thin film material 104.

Figure 3:
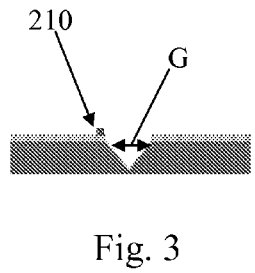
FIG. 3 is a side view of the IR detecting device as taken along line 3-3 of FIG. 2, according to the illustrative embodiments.
Figure 4:
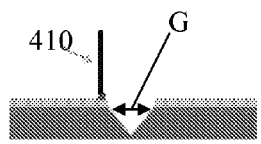
FIG. 4 is a side view of the IR detecting device exhibiting growth of the carbon nanotubes, according to the illustrative embodiments.
Figure 5:
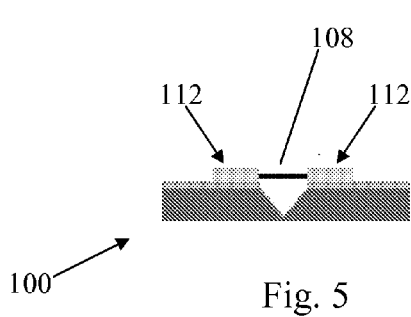
FIG. 5 is a side view of the IR detecting device having the carbon nanotubes rendered in the horizontal position, according to the illustrative embodiments.

FIG. 3 is a side view of the IR detecting device as taken along line 3-3 of FIG. 2. As shown, the catalyst 210 is deposited on the thin film material 104. Referring to FIG. 4, the carbon nanotube growth occurs to generate a vertically aligned carbon nanotube material 410. A tumble process, for example roll printing, is then initiated to render the carbon nanotube material 108 horizontal so that it is suspended across at least a portion of the gap G, as shown in FIGS. 1 and 5. The metal contacts 112 are then added to the IR detecting device 100 as shown in FIGS. 1 and 5.

Figure 6:
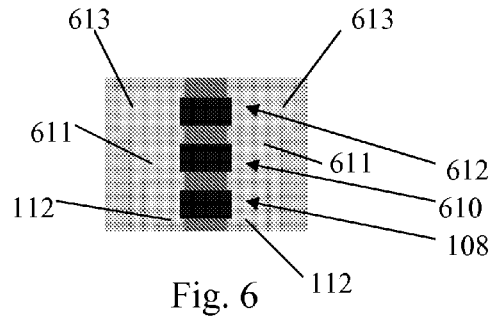
FIG. 6 is a top view of a fully constructed IR detecting device, according to the illustrative embodiments.

FIG. 6 shows a top view of the IR detecting device as fully fabricated and including the detecting element 108 with metal contacts 112 deposited thereon. The completed IR detecting device as shown in FIG. 6 functions as an array of bolometers to detect IR radiation. Each detecting element and its corresponding metal contacts act as a bolometer, including detecting element 610 having metal contacts 611 and detecting element 612 having metal contacts 613.

For the nanotube network to operate as a sufficient hole transporter, the correct contact metal to the nanotube fabric is required. Most metals form a Schottky barrier contact with p-type characteristics to semiconducting nanotubes, meaning that the contacts inject holes into the semiconducting nanotubes. However, n-type nanotube conductors can be employed where holes are injected into the Ca contacts and electrons into the semiconducting nanotube. It is also possible to use other types of alkaline metals that will form a desired nanotube-metal n-type contact. Using a p-type connection on one end of the nanotubes (hole injection from dye into nanotube fabric) and n-type connection on the other end of the nanotube fabric (electron injection from Ca contact into nanotube fabric) allows for the realization of using the nanotube fabric as a hole transport medium in dye-sensitized solar cells.

In an illustrative embodiment of this invention, the CNT fabric consists of a monolayer (approximately 1 nm) up to a thick multilayer (greater than 10 nm) fabric. The polymer can be a polymer having a temperature coefficient of resistance, such as PNIPAM [Poly-(N-isopropylacrylamide)] or any other polymers that perform similar functions within the range of usable characteristics are contemplated. PNIPAM is a polymer that responds to changes in temperature, and thus any similar polymer with coefficient changing characteristics can be employed. In particular, at temperatures below 32° C. PNIPAM assumes a hydrophilic state in which it is can absorb water and increase its volume. As a result, the polymer swells when in the presence of moisture and at temperatures below 32° C. At 32° C. a reversible phase transition to a hydrophobic state occurs. At temperatures higher than 32° C., PNIPAM becomes strongly hydrophobic and tends to expel any water content that may reside in its structure. The dehydration that results causes the polymer to shrink in volume.

For the illustrative CNT-polymer composite bolometer, PNIPAM modulates the resistance occurring at the junction between carbon nanotubes in the network. The volume change experienced by the polymer as a function of temperature translates into a change in the resistivity of the carbon nanotube network. As the bolometer temperature increases, the polymer shrinks, and the nanotubes are brought closer to each other. Likewise, as the temperature decreases, the polymer swells and the nanotubes are drawn further away from each other. The closer that the nanotubes are to each other, the smaller the tunneling barrier that the electrons have to cross in tunneling from one tube to the next. This leads to smaller electrical resistance in the network. On the other hand, the swelling of the polymer results in an increase in the resistance of the bolometer. It is important to note that the electrical resistance of the tunneling junctions between carbon nanotubes in a network is temperature dependent regardless of the presence of the polymer. The function of polymer is to enhance this effect, which results in the increased TCR of the illustrative material.

The layers of the various films and materials can have thickness of approximately 1 nm or less, i.e., the thickness of a given nanotube, or can be composed of several layers of overlapping nanotubes to create a multilayered film having a thickness that exceeds approximately 10 nm. The nanotube matte can be grown or deposited on a surface, as described above, to form a contiguous film of a given density. This film can then be patterned to a minimum feature size of 1 nm, corresponding to a single nanotube left in the article. More typically, the lower dimension sizes of the nanotube film are a consequence of lithographic technology limitations and not any limitations inherent in the illustrative embodiments of the invention. After patterning, the nanotube film can be further integrated with metal interconnects and dielectric passivation layers to create a circuit element.

Figure 7:
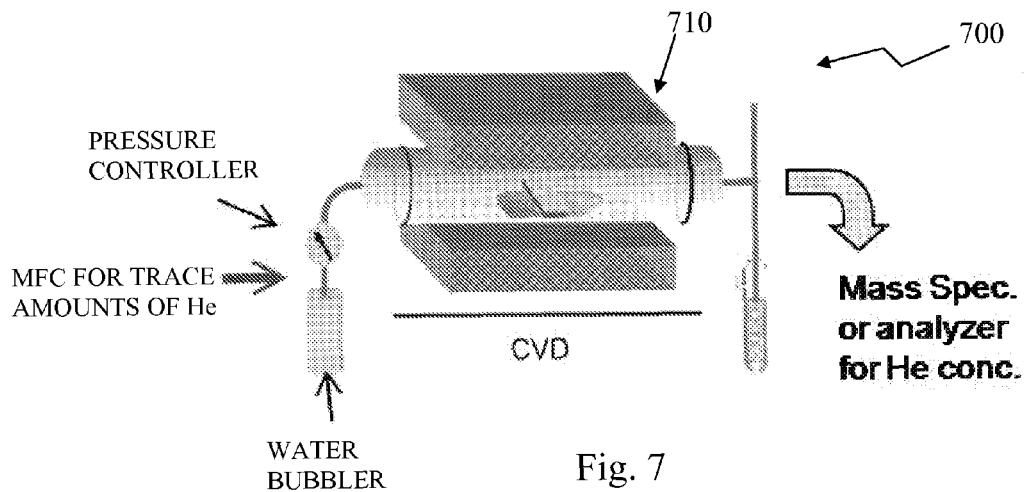
FIG. 7 is a diagram of a system for fabricating the IR detecting device, according to the illustrative embodiments.
Figure 8:
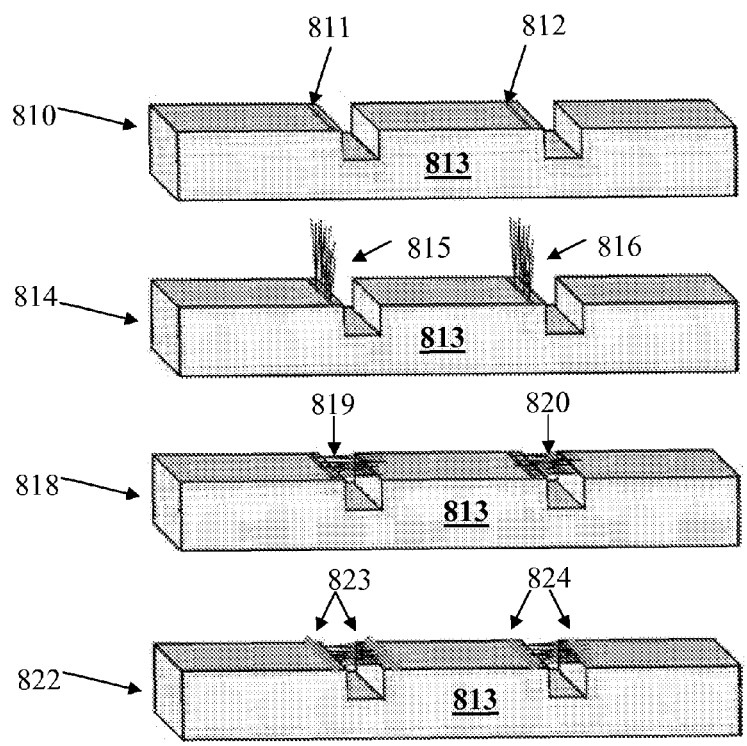
FIG. 8 is a schematic diagram of the side view of the IR detecting device during the fabrication sequence thereof, according to illustrative embodiments.

Reference is made to FIGS. 7 and 8, showing, respectively, a system for constructing the IR detecting device and the fabrication sequence thereof, according to the illustrative embodiments. FIG. 7 shows a system 700 for fabricating the IR detecting device in accordance with the embodiments described herein. As shown, the substrate material for the IR detecting device is inserted into a chemical vapor deposition (CVD) reactor 710 that performs chemical vapor deposition (CVD) to deposit the thin film catalysts on the substrate material, as known in the art, and incorporating a pressure controller, MFC (Mass Flow Controller) for trace amounts of He, and a water bubbler, as well as being operatively connected to a mass spec or analyzer to determine the He concentration, as known in the art. Referring to FIG. 8, a diagram 810 of the catalysts 811 and 812 are shown deposited on the substrate 813. Next, the carbon nanotubes are grown vertically to provide vertically aligned (vertically oriented) carbon nanotubes 815 and 816 as shown on the diagram 814 of the substrate. As shown in FIG. 8, the vertically aligned carbon nanotubes then go through a tumble process where they become horizontally aligned as shown in the diagram 818 of the substrate 813, having horizontal nanotubes 819 and 820. In an illustrative embodiment, the tumble process is performed by roll printing or another technique known in the art. Finally, as shown in the diagram 822 of FIG. 8, metal contacts 823 and 824 are applied to the substrate to provide appropriate contacts for detecting IR radiation.

Figure 9:
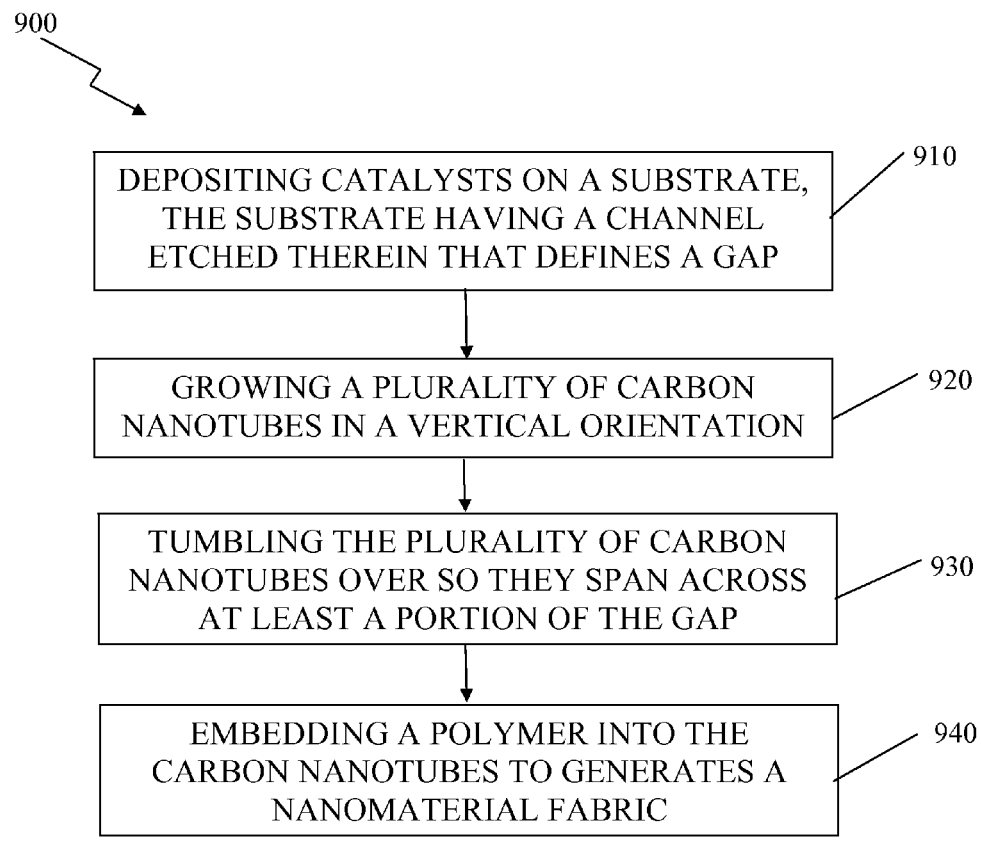
FIG. 9 is a flow chart of a procedure for fabricating the IR detecting device, according to the illustrative embodiments.

FIG. 9 is a flow chart showing a procedure 900 for fabricating the IR detecting device according to the illustrative embodiments. At step 910, the procedure commences by depositing catalysts on a substrate, the substrate having a channel etched therein that defines a gap. Then, carbon nanotubes (CNTs) are grown at step 920 in a vertical orientation. The CNTs can comprise single-wall carbon nanotubes, multi-wall carbon nanotubes, or a combination or single-wall carbon nanotubes and multi-wall carbon nanotubes. The plurality of CNTs are then tumbled over using a tumble process at step 930 to render the CNTs into a horizontal orientation, spanning across at least a portion of the gap in the substrate. The tumble process can be a roll printing process, for example. Finally, at step 940, a polymer is embedded into the CNTs to generate a nanomaterial fabric. Metal contacts can also be formed on the nanomaterial fabric, on opposing sides of the gap of the upper surface of the substrate. In an illustrative embodiment, the nanomaterial fabric can be tuned to be sensitive to IR radiation in a band of approximately 1-12 microns, and is variable within ordinary skill.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the illustrative embodiments can include additional or varied layers to perform further functions or enhance existing, described functions. Likewise, while not shown, the electrical connectivity of the IR detecting device with other IR detecting devices in an array and/or external conduit is expressly contemplated and highly variable within ordinary skill. Additionally, the directional terms such as "top", "bottom", "center", "front", "back", "above", "below", "upper", "lower", "horizontal" and "vertical" should be taken as relative conventions only, and not absolute. Moreover, the nanofabrics have been described as being generally the same type (e.g., all single-walled), however the fabrics may be composed of all multi-walled structures or of a combination of single- and multi-walled structures. Accordingly, this description is meant to be taken only by way of example, and not to otherwise limit the scope of this invention.

What is claimed is:

1. An infrared (IR) detecting device comprising:
a substrate material having a channel etched therein to define a gap in an upper side of the substrate material;
a thin film material deposited on at least a portion of the upper side of the substrate material, the thin film material comprising a carbon nanotube and polymer composition that is formed by initially generating vertically aligned carbon nanotubes, and wherein a portion of the thin film material is suspended over the gap to define an electromagnetic sensing region of the IR detecting device; and
a pair of metal contacts, each metal contact being disposed on opposing sides of the electromagnetic sensing region.

2. The IR detecting device of claim 1 wherein the polymer is Poly-(N-isopropylacrylamide) (PNIPAM).

3. The IR detecting device of claim 1 wherein the carbon nanotubes are single-wall carbon nanotubes.

4. The IR detecting device of claim 1 wherein the carbon nanotubes are multi-wall carbon nanotubes.

5. The IR detecting device of claim 1 wherein the carbon nanotubes are a combination of single-wall carbon nanotubes and multi-wall carbon nanotubes.

6. The IR detecting device of claim 1 wherein the substrate material is one of Si, Ge, SiGe, SiC, Diamond, GaN, GaAs, GaP, AlGaAs, InP, GaP, CdTe, AlN, and InAs.

7. The IR detecting device of claim 1 further comprising a thin film layer deposited on the substrate material comprising SiO2 and having a thickness of approximately 100 nm.

8. The IR detecting device of claim 1 wherein the thin film material is tuned to be sensitive to IR radiation in a band of 1-12 micron.

9. The IR detecting device of claim 1 further comprising sensing circuitry for detecting changes in input impedance using a CMOS technology circuit.

10. The IR detecting device of claim 1 wherein sensitivity of the IR detecting device is increased by an increase in temperature coefficient of resistance of the thin film material.

11. A method of fabricating an IR sensing device, the method comprising the steps of:

depositing a plurality of carbon nanotubes on a substrate in a vertical orientation, the substrate having a channel etched therein that defines a gap on an upper surface of the substrate;
tumbling the plurality of carbon nanotubes over so the plurality of carbon nanotubes span across at least a portion of the gap of the upper surface of the substrate; and
embedding a polymer having a temperature coefficient of resistance to the carbon nanotubes to generate a nanomaterial fabric.

12. The method of claim 11 further comprising the step of forming metal contacts on the nanomaterial fabric, on opposing sides of the gap of the upper surface of the substrate.

13. The method of claim 11 wherein the step of tumbling is performed by a roll printing process.

14. The method of claim 11 wherein the carbon nanotubes comprise at least one of:
single-wall carbon nanotubes, multi-wall carbon nanotubes, and a combination of single-wall carbon nanotubes and multi-wall carbon nanotubes.

15. The method of claim 11 further comprising the step of tuning the nanomaterial fabric to be sensitive to IR radiation in a band of 1-12 microns.

16. A system for fabricating an IR sensing device, the system comprising:
means for depositing a plurality of carbon nanotubes on a substrate in a vertical orientation, the substrate having a channel etched therein that defines a gap on an upper surface of the substrate;
means for tumbling the plurality of carbon nanotubes over so the plurality of carbon nanotubes span across at least a portion of the gap of the upper surface of the substrate; and
means for embedding a polymer having a temperature coefficient of resistance to the carbon nanotubes to generate a nanomaterial fabric.

17. The system of claim 16 further comprising metal contacts formed on the nanomaterial fabric, on opposing sides of the gap of the upper surface of the substrate.

18. The system of claim 16 wherein the means for tumbling is performed by a roll printing process.

19. The system of claim 16 wherein the carbon nanotubes comprise at least one of: single-wall carbon nanotubes, multi-wall carbon nanotubes, and a combination of single-wall carbon nanotubes and multi-wall carbon nanotubes.

20. The system of claim 16 wherein the nanomaterial fabric is tuned to be sensitive to IR radiation in a band of 1-12 microns.

* * * * *